VARIABLE SINGLE-SHOT MULTIVIBRATOR

Filed March 13, 1967

INVENTOR.
DANIEL J. SOLTZ
BY J. Donald Nelson, Jr.
ATTORNEY.

United States Patent Office 3,465,174

Patented Sept. 2, 1969

3,465,174

VARIABLE SINGLE-SHOT MULTIVIBRATOR

Daniel J. Soltz, Elkins Park, Pa., assignor to Honeywell Inc., Minneapolis, Minn., a corporation of Delaware Filed Mar. 13, 1967, Ser. No. 622,486
Int. Cl. H03k *3/26, 17/00, 5/00*
U.S. Cl. 307—274 1 Claim

ABSTRACT OF THE DISCLOSURE

The circuit comprises a variable single-shot multivibrator which selectively produces a single output signal for an input signal and wherein the output signal has a selectively variable time duration which in one embodiment provides two time durations which, in turn, respectively represent a "one" and a "zero."

This invention relates to a switching circuit. More particularly, the invention relates to a single-shot multivibrator, especially a single-shot multivibrator which is capable of producing output signals having different durations.

Multivibrator circuits, and more particularly single-shot multivibrators, are known in the art. However, the time constant or output pulse duration of such single-shot or one-shot multivibrators is usually fixed. This pulse duration is frequently determined by an RC time constant associated with the circuit. For most purposes, this type of limited circuit is satisfactory. In this limited type of operation, the circuit supplies an output signal having a known duration in response to the application of an input signal thereto.

The subject invention relates to a circuit which provides the use of a single-shot or one-shot multivibrator function insofar as a single output signal is produced in response to a single input signal. However, the subject invention further includes means for switchably inserting an additional time constant into the control mechanism of the multivibrator whereby output pulses of different duration may be produced. As a result, by properly determining the relative durations of the pulses produced by the different time constants, pulse width modulation techniques may be utilized. This modulation technique permits the output signal to be indicative of an input signal supplied to the circuit. In addition, the circuit includes means whereby a specific combination of signals is required to produce an output signal.

One object of this invention is to provide a switching circuit.

Another object of this invention is to provide a multivibrator-type switching circuit.

Another object of this invention is to provide a multivibrator-type circuit which produces a single output signal for a single input signal.

Another object of this invention is to provide a multivibrator-type circuit which selectively produces output signals of different duration.

These and other objects and advantages of this invention will become more readily apparent when the following description is read in conjunction with the attached drawings, in which.

Figure 1:
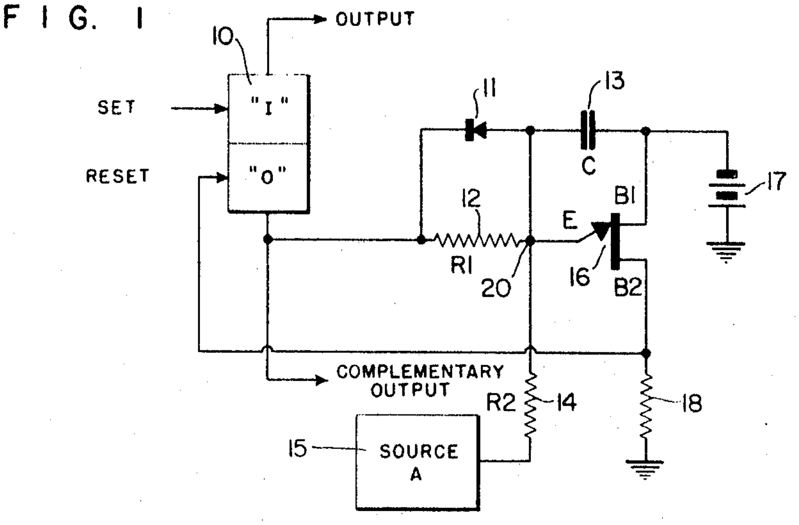
FIGURE 1 is a schematic diagram of a preferred embodiment of the invention.

Referring now to FIGURE 1, there is shown a bistable device 10. This bistable device may be any standard type of binary or flip-flop circuit. The bistable device is shown as having two portions or outputs which are arbitrarily designated as "one" and "zero." This bistable device 10 is so designed that a low level or negative going input signal supplied to the SET input produces a negative or low level output at the signal at the "one" side of the flip-flop. Likewise, a low level or negative going RESET signal applied to the RESET input produces a negative or low level output at the "0" side of flip-flop 10. Of course, by proper change of polarities and the like, the configuration of the circuit may be reversed.

The "0" side of flip-flop 10 is connected to one terminal of resistor 12. Resistor 12, which may be designated as R1, is connected to the emitter electrode, E, of the unijunction transistor 16. Diode 11 is connected in parallel with resistor 12 such that the anode thereof is connected to the emitter electrode of unijunction transistor 16. Diode 11 can, thus, selectively short circuit resistor 12. Capacitor 13 is connected between the emitter and base B1 of unijunction transistor 16. A suitable source of negative potential, for example battery 17, is connected to base B1, transistor 16 and to capacitor 13 which is connected thereto. Source A, designated by reference numeral 15, is connected via resistor 14 to the emitter electrode of transistor 16. Resistor 14 may be designated as R2. Source A may be any selectively variable source of potential, for example the last stage of a shift register or the like. However, source A supplies signals having at least two levels as will appear hereinafter. Base B2 of transistor 16 is connected via load resistor 18 to ground or other suitable reference potential. Also base B2 of transistor 16 is connected to the RESET input of flip-flop 10.

Figure 2:
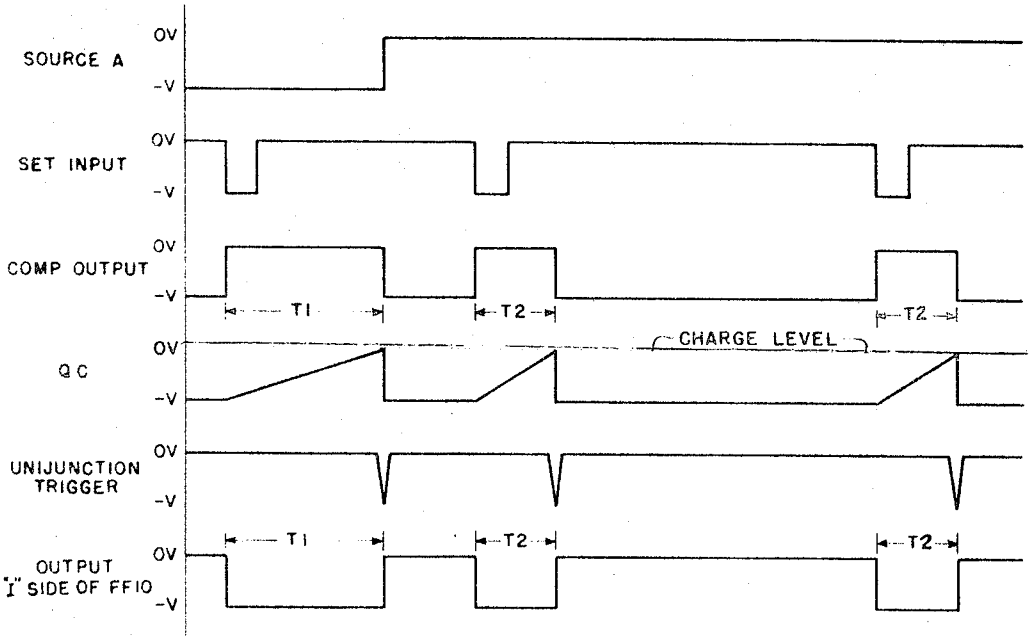
FIGURE 2 is a timing diagram showing waveforms, and the relationship thereof, throughout the circuit shown in FIGURE 1.

Referring now to FIGURES 1 and 2 concurrently, the operation of the circuit shown in FIGURE 1 is described along with the waveforms which are supplied thereto and thereby. It is arbitrarily assumed that the signal supplied by source A is initially a negative signal. The magnitude of this signal is on the order of the magnitude of the signal supplied by source 17. It is assumed, that a negative or low level set signal is first supplied to flip-flop 10 whereby the output signal supplied by the "0" side of the device 10 is a zero or level signal. Thus, diode 11 is reverse biased due to the application of a negative signal at the anode thereof by source 17 as well as source 15 and the coincident application of a zero or high level signal to the cathode thereof by bistable device 10.

In this condition, source A may operate somewhat in the nature of a current drain relative to junction 20 while flip-flop 10 acts as a source via resistor 12. The effect of source A is, however, relatively negligible. Current initially exists in the circuit path from the "0" side of flip-flop 10 through resistor 12 and capacitor 13 to source 17. In accordance with the parameters of these components, the R1C time constant (T1) determines the charging rate of capacitor 13. As capacitor 13 charges, the potential at junction 20 tends to increase. At a determinable level, the potential at the emitter is sufficiently positive so that unijunction transistor 16 is triggered and discharges capacitor 13. Moreover, when unijunction transistor 16 conducts the negative signal produced by unijunction 16 is applied to the RESET input of flip-flop 10. This negative input signal causes flip-flop 10 to switch whereby the output produced by the "0" side becomes a negative of low level signal. This negative of low level signal causes diode 11 to conduct thereby substantially clamping the signal level at the emitter electrode of unijunction transistor 16.

As shown in FIGURE 2, source A supplies a negative or low level signal. This effects no signal or a drain type signal at the emitter of transistor 16. The negative or low level SET signal causes the output at the "0" side of flip-flop 10 to be a zero or relatively high level signal whereby diode 11 is reverse biased. The aforementioned current through resistor 12 and capacitor 13 produces the Q*c* signal which represents the charging of capacitor 13. When Q*c* reaches the level at which unijunction transistor 16 triggers and capacitor 13 is discharged, the output signal switches from a zero or relatively high level to a relatively low level. This signal is supplied to RESET input of flip-flop 10. With the application of the negative or low level RESET input signal to flip-flop 10, a negative or low level output signal is produced at the "0" side thereof thereby rendering diode 11 conductive. Conduction of diode 11 effectively clamps the emitter electrode of unijunction transistor 16 to a negative or relatively low level and inhibits triggering thereof.

At an arbitrary time, source A switches and supplies a zero or relatively high level input signal. This signal is supplied to common junction 20 via resistor 14. However, common junction 20 is substantially clamped by means of diode 11 consequently transistor 16 is not switched. With the application of a SET input signal, the "0" side of flip-flop 10 produces a zero or relatively high level output signal. This high level signal at the "0" output of flip-flop 10 reverse biases diode 11 and removes the clamping effect thereof. In addition, the current path through resistor 12 and capacitor 13 is connected. Thus, the R1C time constant for the charging of capacitor 13 begins. However, at this time, the signal supplied by source A is also a relatively high level signal. Consequently, a current path comprising R2 and C exists between source A and source 17. Thus, the charging time for capacitor 13 now becomes a function of the capacitance C multiplied by the relationship between resistors R1 and R2. In a simplified arrangement wherein flip-flop 10 and source 15 provide high level signals of the same amplitude, resistors R1 and R2 may be considered to be in parallel. Thus, the function R is calculated by the factor $R1+R2/R1R2$. If R1 and R2 are of the same magnitude of resistance $R=R1/2$ or $R2/2$. Thus, the time constant becomes $T=R1/2C$. In any event, even if the resistors and potentials are not equal, it is easily seen that the charging time for capacitor 13 is now T2 where $T2<T1$.

Since the time duration for the charging of capacitor 13 is different for the different levels of signals produced by source A, it is clear that a pulse width modulation function is obtained. Thus, one of the output signals produced by the circuit may be designated as a binary 1 while the other pulse width output signal may be designated as a binary 0. The standard pulse width modulation techniques may be utilized or the signals may be supplied to a gating circuit which is strobed or the like at a selected time for detecting binary 1's or 0's.

Because of the insertion of diode 11, it is seen that the circuit operates to produce an output only after the insertion of a SET input signal. That is, the RESET signal supplied by unijunction transistor 16 causes the flip-flop 10 to produce a low level output signal which renders the diode 11 conductive thereby clamping the emitter junction electrode of unijunction transistor 16. Consequently, the application of a spurious RESET signal is inconsequential in the absence of a prior SET input signal.

It is also noted that, because of this junction, this circuit can operate with synchronous or asynchronous operation.

The next SET input signal, as shown in FIGURE 2, causes a recycling of the circuit operation. Since the signal supplied by source A is still a high level signal, the output signal has a duration T2. A duration T1 would obtain if the signal supplied by source A had been a low level signal.

There has been described herein a preferred embodiment of the invention. It is obvious that certain equivalent devices may be utilized to perform similar functions as described herein. Such modifications as fall within the inventive concept are intended to be included within the scope of this invention.

I claim:

1. In combination, bistable means, first signal supplying means connected to one input of said bistable means is placed in a first condition in response to a signal from said first signal supplying means, switching means comprising a switchable semiconductor means, first circuit means connected to said switching means and to one output of said bistable means to control the operation of said switching means, said first circuit means comprising resistance means connected between an output of said bistable means and a control electrode of said semiconductor means and capacitor means connected between the control electrode of said semiconductor means and a second electrode thereof, a first source means, second circuit means connected to said first source means and said switching means to alter control of the operation of said switching means by said first circuit means, a second source means connected to said second electrode of said semiconductor means and said capacitor means to selectively charge said capacitor means through said resistance means, diode means connected in parallel with said resistance means to selectively short circuit said resistance means in accordance with the signal supplied by the output of said bistable means and thereby modify the rate of charging of said capacitor means, said second circuit means comprising further resistance means connected between said first mentioned source means and said control electrode of said semiconductor means and through which a signal is supplied to said capacitor means to affect the charging thereof, and means connecting a third electrode of said semiconductor means to an input of said bistable means such that triggering of said semiconductor means causes said bistable means to be placed in a second condition, and output means connected to said bistable means.

References Cited

UNITED STATES PATENTS

| | | | |
|---|---|---|---|
| 3,048,708 | 8/1962 | Raver | 307—273 |
| 3,049,625 | 8/1962 | Brockman | 307—239 XR |
| 3,297,883 | 1/1967 | Schulmeyer et al. | 307—269 XR |
| 3,327,134 | 6/1967 | Keane | 307—301 XR |

OTHER REFERENCES

RCA Technical Notes, No. 658, November 1965, Monostable Multivibrator, by D. P. Dorsey.

JOHN S. HEYMAN, Primary Examiner

JOHN ZAZWORSKY, Assistant Examiner

U.S. Cl. X.R.

307—265, 293; 332—9